April 1, 1969  YOSHIO FUKUSHIMA  3,435,745
ELECTRIC SHUTTER FOR USE IN PHOTOGRAPHIC CAMERAS
Original Filed Sept. 8, 1966
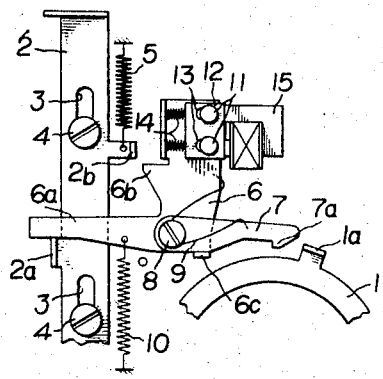
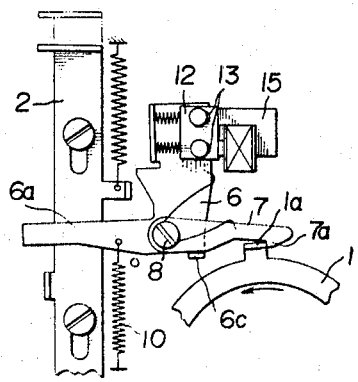
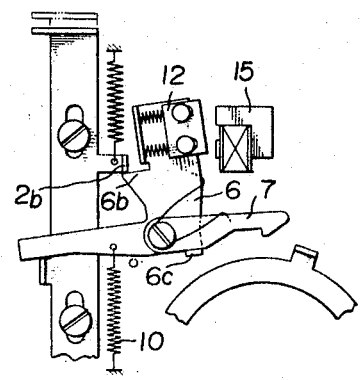
INVENTOR.
YOSHIO FUKUSHIMA
BY
Burgess, Ryan & Hicks
ATTORNEYS

United States Patent Office 3,435,745
Patented Apr. 1, 1969

3,435,745
ELECTRIC SHUTTER FOR USE IN PHOTOGRAPHIC CAMERAS
Yoshio Fukushima, Tokyo, Japan, assignor to Kabushiki Kaisha Ricoh, Tokyo, Japan, a corporation of Japan
Continuation of application Ser. No. 577,882, Sept. 8, 1966. This application Nov. 15, 1966, Ser. No. 600,339
Int. Cl. G03b 9/58
U.S. Cl. 95—53       8 Claims

ABSTRACT OF THE DISCLOSURE

A shutter mechanism responsive to the intensity of the light on the object being photographed and also to the condition of the battery which helps operate the mechanism so that when the battery voltage decreases beyond a certain point the shutter will not open, thus signalling to the operator a need for a new battery.

---

This application is a continuation of application Ser. No. 577,882, filed Sept. 8, 1966, and now abandoned.

This invention relates to an electric camera shutter, and more particularly, to such a shutter which remains open during an interval while it measures and responds to the brightness of a scene being photographed, said shutter being held in such open position by a movable stopper member cooperating with an electromagnet, and said shutter closing following the lapse of said interval.

An object of the present invention is to provide, for use of photographic cameras, an electric shutter of accurate opening and closing movement.

A further object of the present invention is to provide such an electric shutter with a safety device whereby photographing under unsuitable light conditions can be avoided.

For a fuller understanding of the nature and the objects of the invention, reference should be had to the following detailed description taken in connection with the accompanying drawings wherein:

FIG. 1 represents a partial front view of an exemplary embodiment of this invention.

FIG. 2 and FIG. 3 respectively show partial front views of each component of said embodiment shown in FIG. 1 in different operational positions.

FIG. 1 shows an arcuately reciprocable opening and closing member 1 which is coupled to shutter blades (not shown in the drawings). Reciprocatory movement of said opening and closing member is initiated by the operation of a shutter release member and causes the opening and closing movement of the shutter blades. A shutter release lever 2 is depressable from outside of the camera body. The shutter release lever 2 is slidably mounted by means of a slot 3 on a headed stud 4 and is held thereby to the camera body. The shutter release lever is normally held in the raised position of FIG. 1 by a helical tension spring 5 which is fixed, at its upper end, to the camera body. Adjacent the shutter release lever are provided an oscillating member 6 and a stopper lever 7 overlying said oscillating member, both these elements being pivotally mounted on the camera body by a headed stud 8. Stopper lever 7 is urged to rotate in a clockwise direction relative to said oscillating member 6 by the force of an open-legged spring 9, so that a hook 7a formed at an open end of stopper lever 7 is suitably positioned to engage with a bent portion 1a of the reciprocable opening and closing member 1. The oscillating member 6 comprises a side arm 6a, a stopper 6b, and an abutment 6c. As shown in FIGS. 1 and 3 the side arm 6a is pressed against the top of a bent-over projection 2a provided on the shutter release lever 2 by helical tension spring 10, which exerts a counterclockwise torque on oscillating member 6. The stopper 6b is so disposed as to be movable as shown in FIG. 3 into the path of a bent tip 2b formed on the shutter release lever 2, thus preventing descending motion of said shutter release lever. The abutment 6c supports the lower edge of the stopper lever 7, thereby limiting the clockwise rotative movement of the latter.

The aforesaid oscillating member 6 carries an iron piece 12 which is supported thereon by two studs 11, said iron piece being freely movable relative to said oscillating member 6 within the limit permitted by horizontal slots 13. The iron piece 12 is ordinarily held in the protruded position of FIGS. 2 and 3 by the force of expansible compressing springs 14 which extend between said iron piece and the oscillating member 6. The iron piece is cooperative with an electromagnet 15 provided proximate thereto. The electromagnet 15 is of a structure and function well known in the art of electric camera shutters. It is energized by an electric cell instantaneously when the shutter is released and remains energized for a time interval which is determined by a well known exposure control device primarily consisting of transistor(s), condenser(s), and a photocell.

In operation, depression of a shutter release button causes the shutter release lever 2 to initiate a descending motion which actuates the shutter movement and energizes the electromagnet 15. As a result the reciprocable opening and closing member 1 rotates counterclockwise from a position shown in FIG. 1 to the one illustrated in FIG. 2. Hook 7a on stopper lever 7 thereupon latches to bent portion 1a, holding the shutter in an opened position. During the descent of said shutter release lever side arm 6a of the oscillating member 6 tends to rotate counterclockwise under the influence of spring 10, thus following the movement of the bent portion 2a. Since electromagnet 15 is already energized, however, it holds the iron piece 12. As a result the movement of the oscillating member 6 is limited to the length of the slots 13 and is kept small.

Following the time interval, the length of which is determined by brightness of the scene being photographed, the electromagnet 15 is deenergized by the exposure control device; the oscillating member 6 thereupon revolves around the headed stud 8 in a counterclockwise direction under the influence of spring 10; and the abutment 6c of the oscillating member 6 forces the stopper lever 7 to rotate counterclockwise, thus freeing the reciprocating member 1 from an engaged position and restoring it to a position shown in FIG. 1 and simultaneously closing the shutter.

Upon removal of the operator's finger from the shutter release button, the shutter release lever 2 is restored from the depressed position shown in FIG. 2 to the position of FIG. 1 by the force of spring 5, and the oscillating member 6 is restored, against the force of spring 10, to the position shown in FIG. 1, by the movement of the bent portion 2a of the shutter release lever 2.

The operation of this invention as just described presupposes the normal functioning of the electromagnet, which in turn presupposes that the electric cell constituting the source of current therein maintains a predetermined voltage. When the electric cell lacks the prescribed voltage, however, the electromagnet will not exert sufficient force on the iron piece to hold it, and the oscillating member 6 will rotate in the counterclockwise direction under the influence of spring 10 during the descending motion of shutter release lever 2, advancing a stopper 6b into the path of bent piece 2b as shown in FIG. 3, and thereby interrupting the descending motion of the shutter release lever 2. This interruption prevents the release of the shutter and thus alerts the operator to the need for replacing the electric cell. Since the voltage of the electric cell is presupposed to be deficient when release is thus blocked, the exposure control device which also depends on said voltage, would not have functioned properly if exposure had been allowed to occur. Thus the mechanism described serves as a voltage measuring device adapted to prevent exposure unless the voltage is sufficient to achieve proper operation of the automatic exposure control mechanism.

Achieving a sufficiently powerful magnetic force between oscillating member 6 and electromagnet 15 would not be easy in the absence of the specially constructed iron piece 12. The voltage and storage capacity of an electric cell suitable for use in cameras are not large. Also, it is desirable to reduce the current drain as far as possible, in the interest of long life and in order to insure adequate voltage for the automatic exposure control mechanism. Therefore, it is not feasible simply to increase the size and current capacity of the electromagnet. An alternative solution is to construct the mechanism in such a way as to insure close contact between the electromagnet and the element which is to be held by it. It is well known that the presence of even a small air gap between two iron parts of a magnetic circuit greatly weakens the attractive force exerted between said parts. Close contact should exist from the moment the electromagnet is energized and the attractive force of the electromagnet itself ought not to be necessary to insure such close contact.

Some electric shutters presently known to the art employ an electromagnet like electromagnet 15 and an oscillating piece analogous to oscillating member 6. In such prior art shutters, however, the contact portion of the oscillating piece which abuts the electromagnetic pole piece is integral with the rest of the oscillating piece. Said contact portion is not free, therefore, to accommodate itself to the pole piece, and unless both the pole piece and the contact portion are very carefully machined and adjusted, and held in adjustment, the desired close contact will not occur. This raises serious problems during manufacture, when tolerance errors and adjustment errors must be reduced to a minimum. In addition, the likelihood of misalinement of these prior art elements during the life of the camera, due to wear, or shock, or poor servicing, is great.

The construction disclosed herein avoids such problems, since the iron piece 12 is only loosely connected to oscillating member 6. As soon as the iron piece 12 is close enough to the poles of the electromagnets it will automatically adjust itself relative to said poles and to the oscillating member 6 so as to secure the closest possible contact with the poles. Further, a suitable choice of dimensions may be made so that when the elements are in the position of FIG. 1 the iron piece 12 is pressed against the poles of the electromagnet by compression springs 14. As may be noted by comparing FIG. 1 with the other figures, when the shutter release lever moves from a depressed to a fully raised position these springs are compressed because oscillating member 6 is then moved slightly clockwise relative to iron piece 12. Thus, the iron piece 12 is in intimate contact with the electromagnet's poles when the electromagnet is energized. This remains true even if shutter release lever 2 has begun a downward movement, as springs 14 will keep these elements together even during some rotation of oscillating member 6.

The following is claimed:

1. In electric shutter mechanism for use in photographic cameras, a shutter opening and closing member coupled to a shutter, a shutter release lever, an oscillating member for holding the shutter in an opened position, a stop lever adapted to releasably hold said first mentioned member, an iron piece on said oscillating member which is attracted to an electromagnet energizable upon shutter release operation, said iron piece being pressed against said electromagnet by means of said shutter release lever when said lever is in normal position.

2. An electric shutter mechanism for use in photographic cameras characterized in that a shutter release lever is provided proximate thereto, an oscillating member which has an effect of holding the shutter in an opened position, said oscillating member being provided buoyantly thereon, an iron piece which is attracted to an electromagnet energizable instantaneous with the shutter release operation, said oscillating member being tiltable, coupled with the motion of the shutter release lever, when the electromagnet lacks capacitance of attracting the iron piece, whereby a portion of said oscillating member prevents the shutter release lever from further movement.

3. In electric shutter mechanism for use in a photographic camera having a shutter release lever movable from a normal position and an oscillating member proximate to the shutter release lever which is adapted to hold the shutter in an opened position, the improvement comprising an iron piece buoyantly mounted on the oscillating member adapted to be attracted to an electromagnet energizable upon movement of the shutter release lever, said iron piece being pressed against said electromagnet by means of said shutter release lever when said lever is in the normal position.

4. In an electric shutter mechanism for use in a photographic camera having a movable shutter release lever movable from a normal position and an oscillating member proximate to the shutter release lever which is adapted to hold the shutter in an opened position, the improvement comprising an iron piece mounted on the oscillating member adapted to be attracted to an electromagnet energizable upon movement of the shutter release lever, means for exerting a tilting force upon the oscillating member in a direction to disengage said iron piece from said magnet upon motion of the shutter release lever, said tilting force sufficing to move the iron piece away from the electromagnet when the current in the electromagnet is less than a desired amount and said tilting force sufficing to tilt the oscillating member when said iron piece moves away from the electromagnet into a tilted position, and cooperating blocking means upon the operating lever and the oscillating member for restricting the motion of the operating lever when the oscillating member is in a tilted position and thereby preventing release of the shutter.

5. In a camera having a shutter, a shutter release member movable from a normal position to an operated position to effect release of the shutter, a retaining member movable from a first retaining position to a second retaining position when the shutter opens, said retaining member holding the shutter open when in the second retaining position, an electromagnet, and means operable upon movement of the shutter release member to produce a flow of current in the electromagnet, the improvement comprising a latch member movable between a latching position wherein it can hold said shutter open and an unlatching position wherein said shutter may close, latch means on said latch member operable when the latch member is in the latching position to hold the retaining member in the unlatching position, said latch means being inoperable to hold the retaining member when the latch member is in the unlatching position, an armature loosely mounted on the latch member for limited motion relative thereto, said armature being so placed as to contact the electromagnet when the latch member is in the latching position but not when the latch member is in the unlatching position, first means tending to move the latch member from the latching to the unlatching position and thereby to separate the armature from the electromagnet, said first means having insufficient force to separate the armature and the electromagnet when current of a desired amount is flowing through the electromagnet but having sufficient force to separate the armature and the electromagnet when current of a lesser amount is flowing through the electromagnet and thereupon to move the latch member from the latching position to the unlatching position.

6. The device of claim 5, comprising blocking means movable from an inoperative to an operative blocking position when the latching member moves from its latching position to its unlatching position, said blockng means being adapted when in the operative position to prevent opening of the shutter.

7. A camera shutter mechanism comprising a shutter release plunger movable between a normal position and a depressed position, a shutter mechanism releasable by motion of the shutter release plunger from the normal to the depressed position, a shutter retaining member movable upon release of the shutter from a normal to a hold-open position, said shutter retaining member holding the shutter open when in the hold-open position, an electromagnet having poles, a latching member pivoted for rotation between a latching position and an unlatching position, an armature loosely mounted on the latching member, said armature being movable into contact with the poles of the electromagnet when the latching member is in the latching position and said armature moving out of contact with said poles when the latching member moves to the unlatching position, means for exerting a resilient force on the latching member sufficient, when unopposed, to move said latching member to the unlatching position, means operable when the shutter release plunger is in the normal position to hold the latching member in the latching position, means for supplying a current to the electromagnet from the moment when the shutter release plunger moves a predetermined distance from the normal position toward the depressed position, and for a desired period of time thereafter, said current being sufficient to retain the armature in contact with the poles of the electromagnet, and means on the latching member engaged with the shutter retaining member when the latching member is in the latching position but not when the latching member is in the unlatching position, said means holding the shutter retaining member in the hold-open position when engaged with the shutter retaining member.

8. The device of claim 7 comprising a stopper member on the latching member operable when the armature is separated from the poles of the electromagnet, said stopper member when operable engaging a portion of the shutter release plunger as said plunger moves from the normal to the depressed position and blocking completion of the motion of said plunger thereby preventing release of the shutter.

References Cited

UNITED STATES PATENTS

| | | | |
|---|---|---|---|
| 3,116,659 | 1/1964 | Waroux. | |
| 3,165,989 | 1/1965 | Kiper. | |
| 3,200,723 | 8/1965 | Topaz | 95—11.5 |
| 3,205,795 | 9/1965 | Grey. | |

JOHN M. HORAN, *Primary Examiner.*

L. H. McCORMICK, *Assistant Examiner.*